(12) United States Patent
Kurihara et al.

(10) Patent No.: US 9,020,568 B2
(45) Date of Patent: Apr. 28, 2015

(54) MOBILE DEVICE

(71) Applicant: Panasonic Corporation, Osaka (JP)

(72) Inventors: Junnosuke Kurihara, Milpitas, CA (US); Jae Jung, Santa Clara, CA (US); Luca Rigazio, San Jose, CA (US)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 49 days.

(21) Appl. No.: 13/860,693

(22) Filed: Apr. 11, 2013

(65) Prior Publication Data

US 2014/0308992 A1    Oct. 16, 2014

(51) Int. Cl.
  *H04M 1/02* (2006.01)
  *G06F 3/0482* (2013.01)
  *H04M 1/725* (2006.01)

(52) U.S. Cl.
  CPC .......... *H04M 1/0202* (2013.01); *G06F 3/0482* (2013.01); *H04M 1/72583* (2013.01); *H04M 2250/10* (2013.01); *H04M 2250/22* (2013.01)

(58) Field of Classification Search
  USPC ...................................... 455/566, 572, 575.8
  See application file for complete search history.

(56) References Cited

U.S. PATENT DOCUMENTS

| 2007/0277105 | A1 | 11/2007 | Lee et al. |
| 2009/0100384 | A1 | 4/2009 | Louch |
| 2011/0035706 | A1 | 2/2011 | Kinoshita et al. |

FOREIGN PATENT DOCUMENTS

| EP | 1860540 | 11/2007 |
| JP | 2007-180951 | 12/2007 |

OTHER PUBLICATIONS

Extended European Search Report, dated Jun. 23, 2014, in counterpart European Application No. 14164056.5-1972.

*Primary Examiner* — Sam Bhattacharya
(74) *Attorney, Agent, or Firm* — Greenblum & Bernstein P.L.C.

(57) ABSTRACT

A mobile device and a display control method can be provided having good operability and enabling selection of a screen display for the mobile device from a mode displaying a plurality of kinds of screens to suit a user's preferences. An aspect of the mobile device includes a touch screen, a display, and a menu screen generator. The touch screen receives input from a user. The display displays a menu screen and is provided such that the touch screen is overlaid on the display. The menu screen generator generates the menu screen displayed on the display. The menu screen can be selected from a plurality of user interfaces.

17 Claims, 11 Drawing Sheets

MOBILE DEVICE

BACKGROUND OF THE INVENTION

1. Field of the Invention

The present invention relates to a mobile device including a touch screen for input operations and to a display control method enabling control of the mobile device. In particular, the present invention relates to a mobile device capable of customizing a menu screen of the mobile device to suit a user's preferences.

2. Description of Related Art

Touch screens for input operations are increasingly installed in devices such as cellular telephone terminals or portable data terminals (smartphones). This kind of touch screen includes a touch sensor provided so as to overlap with a display screen. When a user employs a finger or a pen having a pointed tip (a stylus) to touch the display screen, the touch sensor detects a contact position. Then, by comparing the contact position with a position of a button or icon displayed on the screen, the user is determined to have operated the button or icon on the screen.

A mobile device having such a touch screen installed has a high degree of freedom in displaying information on a screen and thus a technology is known in which a user customizes icon images displayed on the screen of the mobile device by kind and position (see Japanese Patent Laid-Open Publication No. 2007-180951). By employing such customization technology, the user's preferences for screen display can be reflected.

However, although the user's preferences for screen display (look) can be reflected because the mobile device disclosed in Japanese Patent Laid-Open Publication No. 2007-180951 provides a tool to customize the kind and position of icons, consideration of the user's preferences for operability may be lacking.

This so-called preference for operability refers to a screen display facilitating operation in response to a user's characteristics (such as vision or size of fingers), or to a screen display suited to the user's habits and tastes. For example, large icons are easier to see than small icons for a person with poor eyesight and large icons are easier to accurately touch operate than small icons for a person with large fingers.

SUMMARY OF THE INVENTION

The present invention provides a mobile device having good operability and enabling selection of a screen display for the mobile device from a mode displaying a plurality of kinds of screens.

One aspect of a mobile device according to the present invention is a mobile device including a touch screen, a display, and a menu screen generator. The touch screen receives input from a user. The display displays a menu screen and is provided such that the touch screen is overlaid on the display. The menu screen generator generates the menu screen displayed on the display. The menu screen can be selected from a plurality of user interfaces.

One aspect of a display control method according to the present invention is a display control method including user status detection detecting a user status when power is turned on; switching determination determining whether to switch a user interface for a menu screen based on the user status; selection screen display displaying a selection screen to select the user interface when the switching determination determines that switching is to be performed; and menu screen display displaying on a display a menu screen using the user interface selected by a user.

With the present invention, a mobile device and a display control method can be provided having good operability and enabling selection of a screen display for the mobile device from a mode displaying a plurality of kinds of screens to suit a user's preferences.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

An embodiment of a mobile device and a display control method according to the present invention are described with reference to the drawings.

Figure 1:
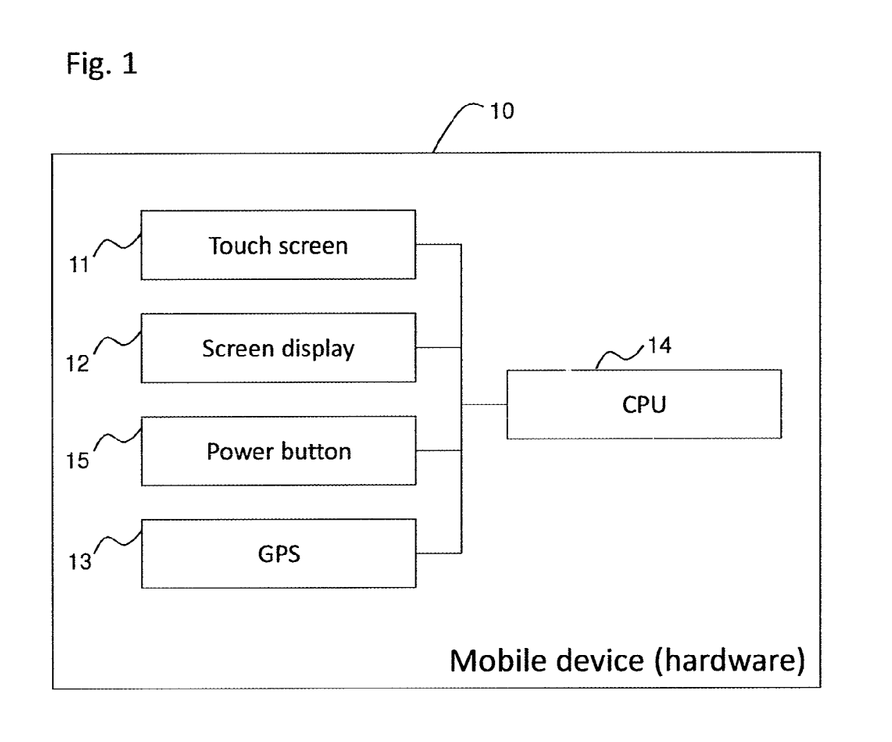
FIG. 1 is a block diagram illustrating an exemplary configuration of principal hardware in a mobile device according to a first embodiment.

FIG. 1 illustrates an exemplary hardware configuration of the mobile device according to a first embodiment. As shown in FIG. 1, a mobile device 10 includes a touch screen 11, a screen display 12, a GPS 13, a CPU (Central Processing Unit) 14, and a power button 15.

When the touch screen 11 is touched with a user's finger or a pen having a slim tip (a stylus), the touch screen 11 is capable of outputting a signal signifying a touched position.

The screen display 12 is a device, such as a display, displaying image data or text data and is positioned such that a surface of the touch screen 11 is overlaid on the screen display 12. Visual data (variable operators, e.g., various buttons, icons, and slider bars) can be displayed on the screen display 12. Positions of each item of visual data can be used to associate the visual data with a contact position (user operation position) on the touch screen 11. Specifically, when the user touches the surface of the touch screen 11 so as to operate each button or icon displayed on the screen display 12, the touch operation can be processed as an input operation for a specific button or icon corresponding to the touched position. The touch screen 11 and the screen display 12 are also employed in display and operation for making an audio transmission on the mobile device 10, in data transmission via the Internet and display of that data, and in operation and display of applications installed on the mobile device 10.

The GPS 13 is a global positioning system capable of obtaining a position of the mobile device 10 by communicating with GPS satellites.

The CPU 14 is a computer device configured with a microcomputer, RAM, ROM, or the like. The CPU 14 controls the touch screen 11, the screen display 12, and the like.

The power button 15 is a button to turn power of the mobile device 10 on or off.

Figure 2:
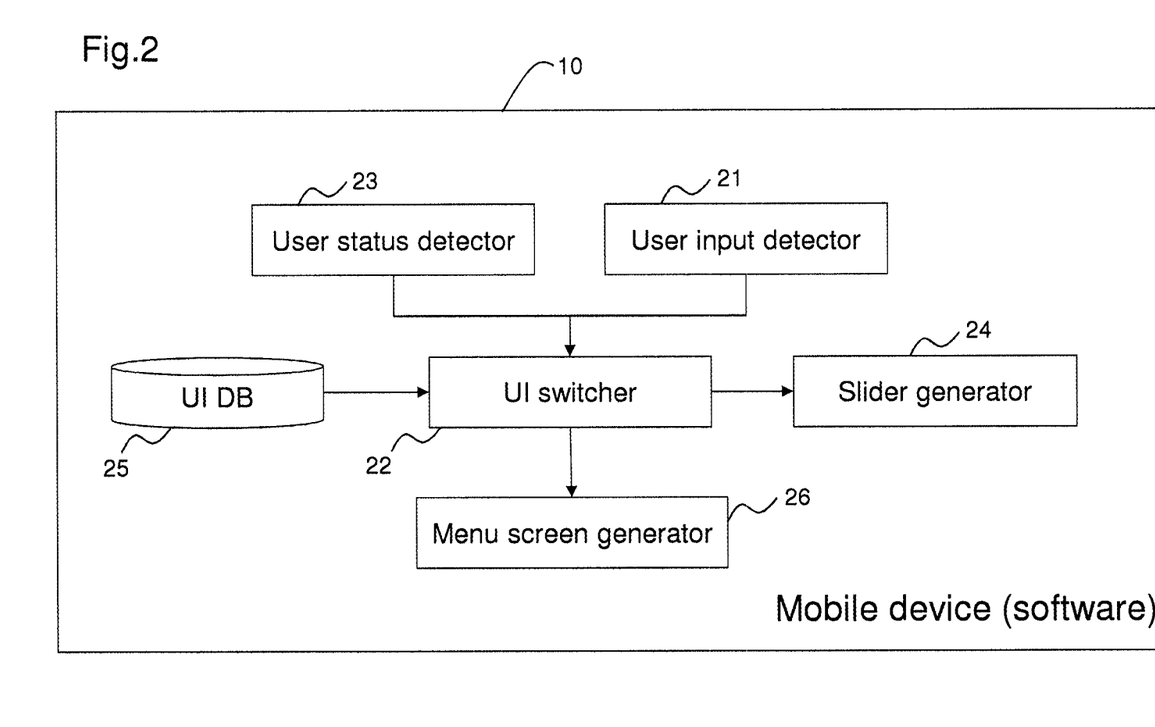
FIG. 2 is a block diagram illustrating an exemplary configuration of principal software in the mobile device according to the first embodiment.

FIG. 2 is a diagram illustrating a software configuration configured with a program or data run by the CPU 14. The software for the program or data run by the CPU 14 includes a user input detector 21, a user interface (UI) switcher 22, a user status detector 23, a slider generator 24, a UI database (DB) 25, and a menu screen generator 26.

The menu screen generator 26 generates and displays on the screen display 12 a menu screen enabling the user to use the mobile device 10. From the menu screen, the user can perform, for example, display and operation to make an audio transmission, data transmission via the Internet and display of that data, and launching of applications installed on the mobile device 10. In most mobile devices, the menu screen is displayed immediately after launch, then the user makes an audio transmission or launches a different application from the menu screen. In the mobile device 10 according to the present embodiment, the menu run by the menu screen generator 26 includes two or more kinds of user interface. When the menu screen generator 26 is launched, a UI_ID is designated, the UI_ID indicating the kind of UI. Thereby, the menu screen with the UI corresponding to the designated UI_ID is displayed.

The user input detector 21 detects operation content of the touch screen 11 or the power button 15 from the user, then transmits the operation content to the UI switcher 22.

Based on the status of the user, the UI switcher 22 determines whether the user needs the menu screen UI to be switched. When the menu screen UI needs to be switched, the UI switcher 22 suggests candidate images for the menu screen UI to the user and has the user select a preferred UI. The UI switcher 22 then transmits the UI_ID corresponding to the selected UI to the menu screen generator 26. In addition, the last selected UI_ID and user status detection results are retained in order to determine whether the UI needs to be switched.

The user status detector 23 transmits data to the UI switcher 22 such as location data of the mobile device 10 obtained from the GPS 13, schedule data for the user obtained from applications installed on the mobile device 10, and data for an immediate environment obtained from a camera provided to the mobile device 10.

Figure 4:
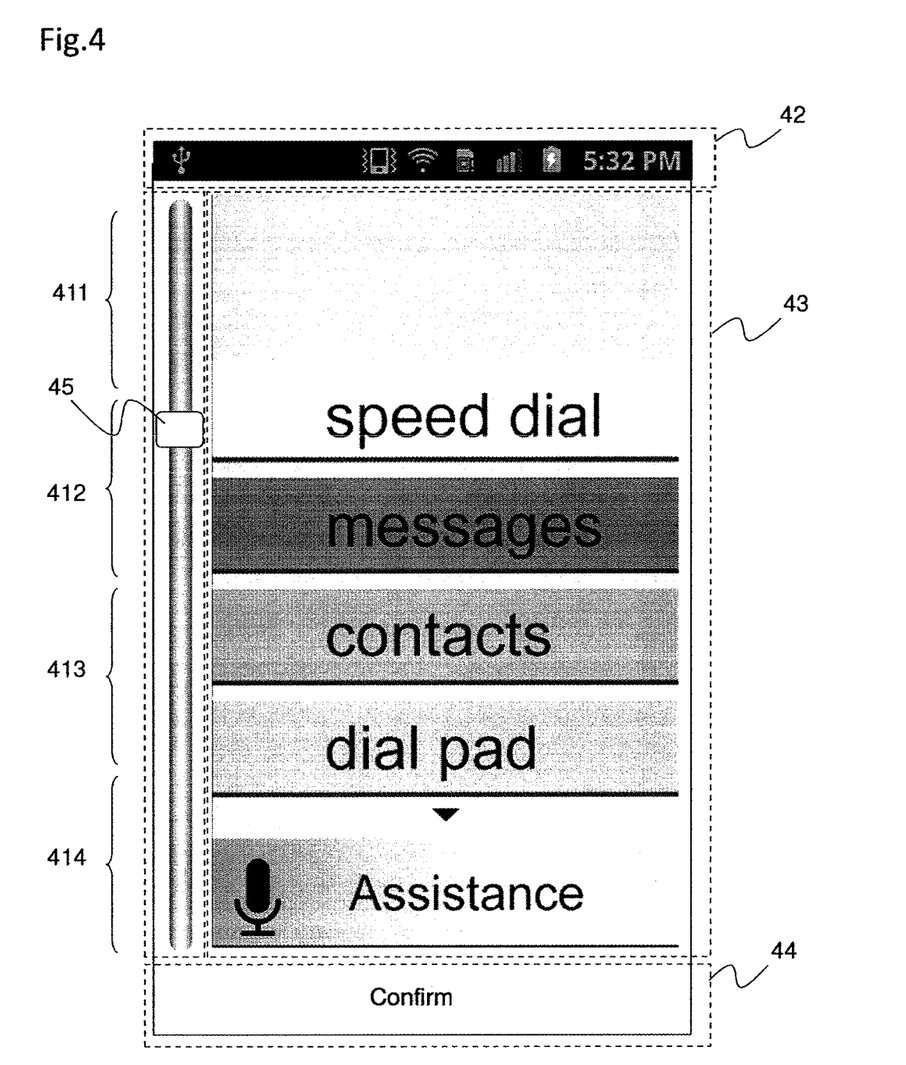
FIG. 4 illustrates an exemplary screen display when switching the screen display of the mobile device according to the first embodiment.

The slider generator 24 performs display of the slider bar, the slider bar enabling menu screen selection. FIG. 4 illustrates an exemplary screen when the slider bar is displayed to enable menu screen selection. A slider bar 41 is on a left portion of the screen. An information display bar 42 is on a top portion of the screen. A confirmation button 44 is on a bottom portion of the screen. Other regions of the screen form a UI sample display area 43. The user can manipulate a position of a slider 45 on the slider bar 41. When the user changes the position of the slider 45, the kind of UI for the menu screen displayed in the UI sample display area 43 changes according to the position of the slider 45.

In the present embodiment, the slider bar 41 is broken into four regions 411 through 414. UI_IDs are set to correspond to the slider 45 being positioned in each region. For example, when the slider 45 is positioned in the region 412, as in FIG. 4, a correspondence is made such that UI_ID=2 and the UI for UI_ID=2 is displayed in the UI sample display area 43.

When the users preferred menu screen is displayed, the user presses the confirmation button 44 and can thereby decide the menu screen to be used. After the confirmation button 44 is pressed and the menu screen to be used is decided, the slider bar 41, the confirmation button 44, and the UI sample display area 43 disappear from the screen and are replaced by the menu screen.

The UI database 25 retains the UI_ID indicating the kind of UI for the menu, as well as data for the menu screen corresponding to the UI_ID when actually launched.

The menu screen display 26 generates and displays a menu screen to enable, for example, display and operation for making an audio transmission on the mobile device 10, data transmission over the Internet and display of that data, and operation and display of applications installed on the mobile device 10. In the present embodiment, the menu screen can be selected from a plurality of UIs. Selection of the UI can be performed by designating the UI_ID and launching the menu screen generator 26.

Figure 5A:
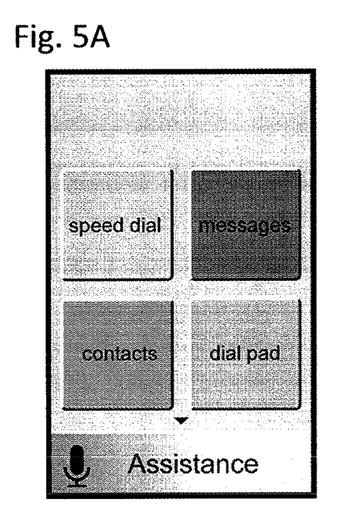
FIGS. 5A to 5D illustrate exemplary screen displays of the mobile device according to the first embodiment.
Figure 5B:
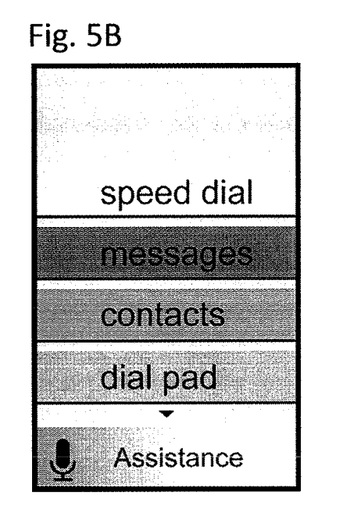
Figure 5C:
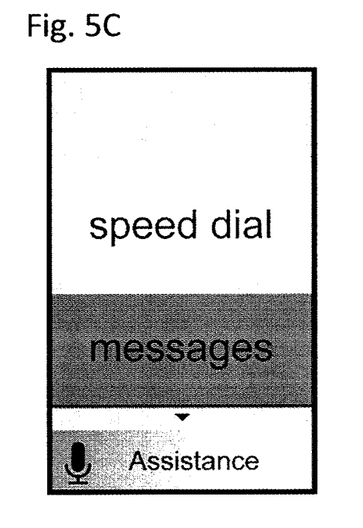
Figure 5D:
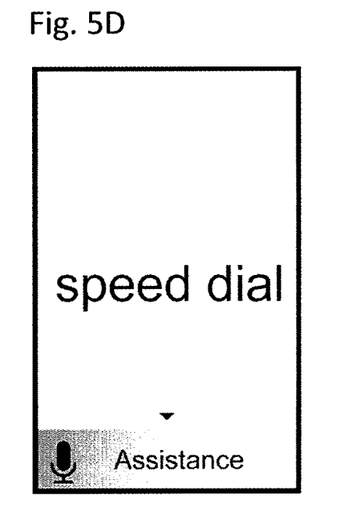

Herein, specific examples of the user interface are described. FIGS. 5A to 5D are exemplary UIs stored in the UI database 25. In the present embodiment, the UI database 25 holds four kinds of UIs. FIG. 5A illustrates an example of a tile format UI, FIG. 5B illustrates an example of a list format UI, FIG. 5C illustrates an example of a large button format UI, and FIG. 5D illustrates an example of a single feature format UI. These UIs are each associated with a UI_ID signifying the kind of UI such that the tile format UI is UI_ID=1, the list format UI is UI_ID=2, the large button format UI is UI_ID=3, and the single feature format UI is UI_ID=4.

In the tile format UI, a total of four icons are positioned in a 2×2 tiled shape. This UI is appropriate for a graphical display, such as displaying pictures on the icons.

In the list format UI, a total of four icons are positioned in a 4×1 list format. A lateral width of each icon is long, and thus this UI is appropriate for text display.

In the large button format UI, a total of two icons are positioned in a 2×1 list format. Each icon is large in size, and thus text or images can be displayed so as to be readily visible. Touch operations are also facilitated.

In the single feature format UI, only one icon is displayed on the menu screen. There is only one icon, and thus there is no concern that another icon may be mistakenly touch operated. Therefore this UI is appropriate for a user who typically only uses a single feature.

Moreover, the UI is not necessarily limited to these four kinds. The menu screen generator 26 can correspond to various UIs to suit the user's preferences.

Figure 3:
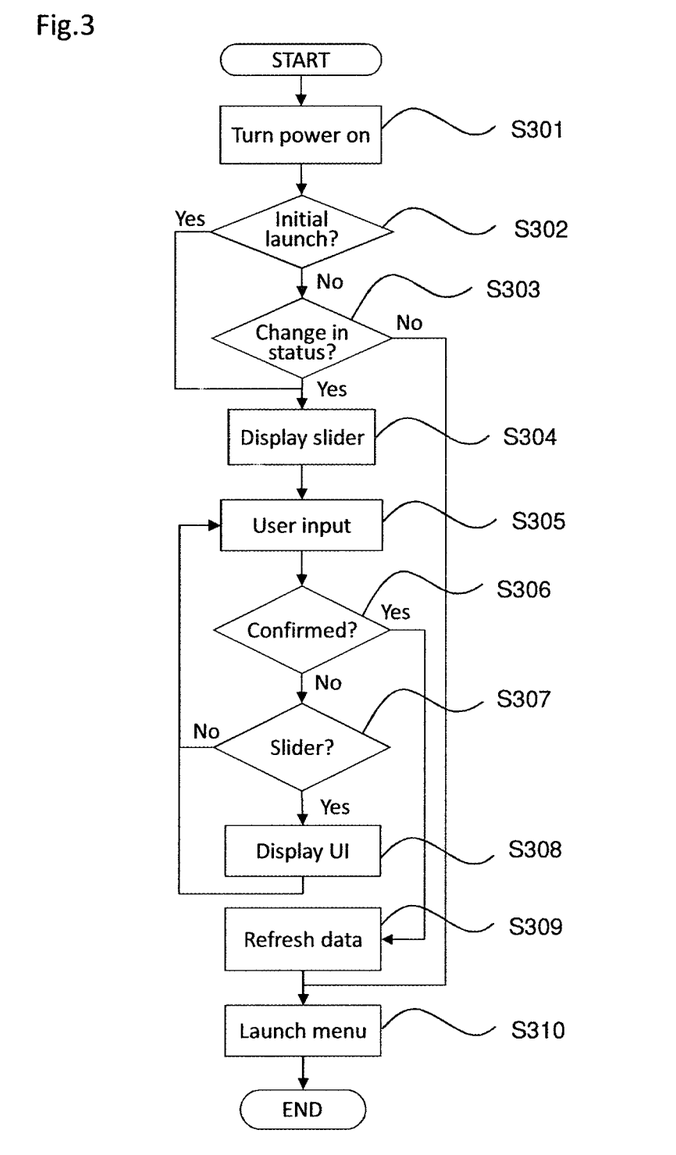
FIG. 3 is a flowchart illustrating operations of the mobile device according to the first embodiment.

FIG. 3 is a flowchart illustrating a process executed by the CPU 14. In general, a mobile device displays a menu screen when a user turns the mobile device on. However, in the mobile device 10 of the present embodiment, selection and switching of the menu screen UI is performed before the menu screen is displayed.

The user first turns on the mobile device 10 (step S301). The user input detector 21 detects that the power button 15 on the mobile device 10 has been depressed and the power turned on, then informs the UI switcher 22. The UI switcher 22 then determines whether the current launch is an initial launch (step S302). When no data is stored for a last selected UI_ID, the UI switcher 22 determines that the current launch is the initial launch. When data for the last selected UI_ID is stored, the UI switcher 22 determines that the current launch is not the initial launch.

When the current launch is the initial launch, the process skips step S303 and advances to step S304 (Yes in step S302). When the current launch is not the initial launch, the process advances to step S303 (No in step S302).

Next, the UI switcher 22 queries the user status detector 23 for the user status, then compares the user status with the stored previous user status and determines whether the user status has changed. When the user status has changed, the process advances to step S304 (Yes in step S303). When the user status has not changed (No in step S303), the previously selected UI_ID is designated and the menu screen generator 26 is called up (step S310).

A specific example of a change in the user status in step S303 is described. For example, when GPS data at the time of a previous launch is for an office (indoors) and the current GPS data obtained by the user status detector 23 is for a ski area (outdoors), the user status is determined to have changed and (for example, because the user's touch operation accuracy on the touch screen 11 may be altered, perhaps because the user is wearing gloves at the ski area) the UI switcher 22 determines that the UI should be switched. In addition, using brightness data from the camera (not shown in the drawings) provided to the mobile device 10, when brightness for the surrounding area is much greater compared to the time of the previous launch, the UI switcher 22 determines that the UI should be switched (in view of the excessive brightness, making the screen difficult to see). In addition, the UI switcher 22 can also determine whether the UI should be switched for work or private use by utilizing the user's schedule data. Moreover, a basis for the determination is not necessarily limited to the above-noted conditions; instead, the determination may be made based on various conditions.

When the process up to step S303 determines that the current launch is the initial launch or that the user status has changed, as described above, the UI switcher 22 performs a UI switching process beginning at step S304.

When the UI switching process is determined to be necessary, the UI switcher 22 calls up the slider generator 24 to display the slider bar 41, the confirmation button 44, and a UI sample image on the screen display 12 (step S304). The UI sample image displayed at this point may employ the UI sample image for the UI corresponding to the UI_ID at the time of the previous launch. When the current launch is the initial launch and there is no UI_ID data for a previous launch, a predetermined UI_ID may be used.

Next, the user input detector 21 receives user input from the touch screen 11 and the received content is transmitted to the UI switcher 22 (step S305). After receiving the user input, the UI switcher 22 determines whether the confirmation button 44 was pressed (step S306).

When the UI switcher 22 determines that the confirmation button 44 was not pressed (No in step S306), the UI switcher 22 next determines whether the position of the slider 45 on the slider bar 41 has changed (step S307). When the UI switcher 22 determines that the position of the slider 45 has not changed (No in step S307), the UI switcher 22 does nothing and once again waits to receive user input in step S305 (because the user performed a touch operation of a region other than the confirmation button 44 and the slider bar 41, the UI switcher 22 does nothing and waits for the next input). When the UI switcher 22 determines that the position of the slider 45 has changed (Yes in step S307), an image in the UI sample display area 43 is refreshed to the UI sample image for the UI_ID corresponding to the position of the slider 45 (step S308).

When the UI switcher 22 determines that the confirmation button 44 was pressed in step S306 (Yes in step S306), the UI switcher 22 refreshes (stores, during the initial launch) the selected UI_ID and the user status data obtained from the user status detector 23 (step S309) and, depending on the UI_ID selected, the menu screen generator 26 launches the menu (step S310).

Thus, during launch the user can select the UI suiting the user's preferences and operability is improved. In addition, a switching task only occurs when the user status changes and the UI needs to be switched. Therefore, there is no need for the user to perform the switching task when the user status has not changed and usability is improved.

Moreover, in the present embodiment, a menu screen UI is switched; however, the present embodiment is not necessarily limited to switching the menu screen UI. In addition to the menu screen, a UI for home screen applications or for each application may also be switched.

Moreover, in the present embodiment, a slider bar is used for selection of a UI_ID; however, a selection tool is not limited to the slider bar. In addition to the slider bar, the user can select the kind of UI while referring to a UI sample display by, for example, selecting with a button, selecting from a list, selecting by switching the UI sample image using a swiping operation on the screen, and selecting with a button provided as hardware.

Second Embodiment

Hereafter, a specific embodiment of a remote access system used in a mobile device according to the present invention is described with reference to FIGS. 6 to 11. The remote access system is a system implementing remote access using mobile devices each with a communication feature such that operations on a first terminal (user terminal) are subject to proxy control by a second terminal (support terminal). The remote access enables a user unfamiliar with operation of the mobile device to elect a second user familiar with operation of the mobile device as a proxy for complex operations. Thus, usability of the mobile device can be improved. Herein, operations of the remote access system according to the present embodiment are summarized. FIG. 9 summarizes the operations of the remote access system according to the present embodiment.

A situation is pictured in which a grandfather unfamiliar with operating the mobile device wishes to add a contact to an address book but does not know how to do so and becomes confused (step S901). The grandfather activates the remote access and calls his grandson, whose contact information is already entered in the mobile device, to request that his grandson take proxy control of the address book using the remote access (step S902). The grandfather's mobile device (user terminal) enters a remote access mode and connects with the grandson's mobile device (support terminal). The screen of the user terminal is then transmitted to the support terminal via a communication network. A conversation can then take place between the grandfather and the grandson over the communication network (steps S903 and S904). When the grandfather asks his grandson to add an address to the address book (step S905), the grandson remotely operates the screen of the user terminal shared on his support terminal in order to complete the desired operation (steps S906 and S907). In this way, the remote access enables the grandson, who is familiar with operation of the mobile device, to take proxy control to perform an operation instead of his grandfather, who is unfamiliar with operation of the mobile device. Thus, even the grandfather who is unfamiliar with operation of the mobile device can make full use of the mobile device.

Figure 6:
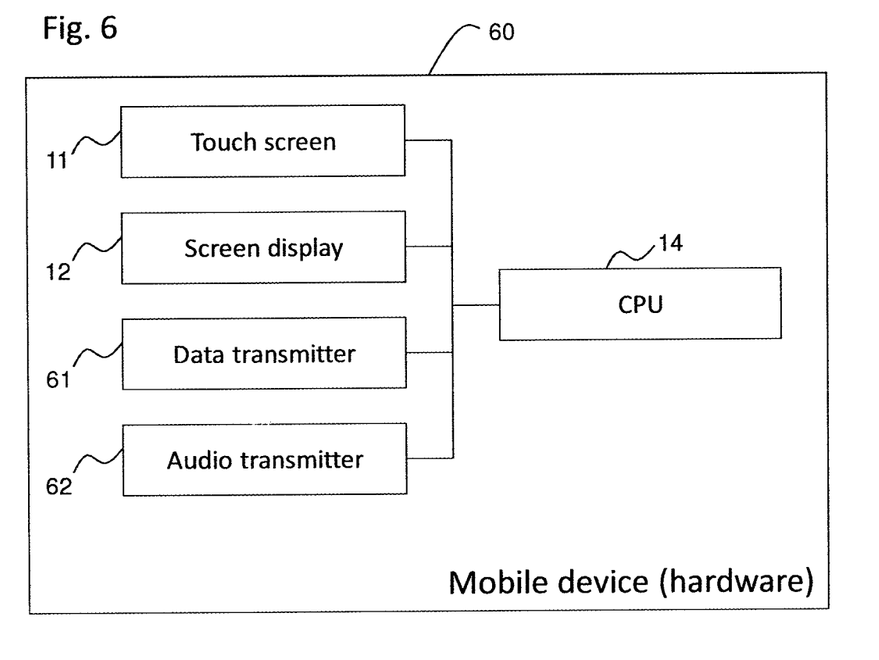
FIG. 6 is a block diagram illustrating an exemplary hardware configuration in a mobile device used with the remote access system according to a second embodiment.

FIG. 6 illustrates an exemplary configuration of hardware in the mobile device used with the remote access system according to the second embodiment. As shown in FIG. 6, a mobile device 60 includes a touch screen 11, a screen display 12, a data transmitter 61, an audio transmitter 62, and a CPU 14. In FIG. 6, the touch screen 11, the screen display 12, and the CPU 14 correspond to elements in the first embodiment and are therefore given the same reference numerals. Accordingly, a description thereof is omitted.

The data transmitter 61 performs data transmission. The data transmission may, for example, take place over a wireless network (public data transmission network) provided by a mobile telecommunications company, or the data transmission may use WiFi (Wireless Fidelity) that performs wireless LAN data transmission.

The audio transmitter 62 is an audio transmitter. The audio transmitter may, for example, make an audio transmission over the wireless network (public communications network) provided by the mobile telecommunications company, or may make an audio transmission with VoIP (Voice over Internet Protocol) using the Internet.

Figure 7:
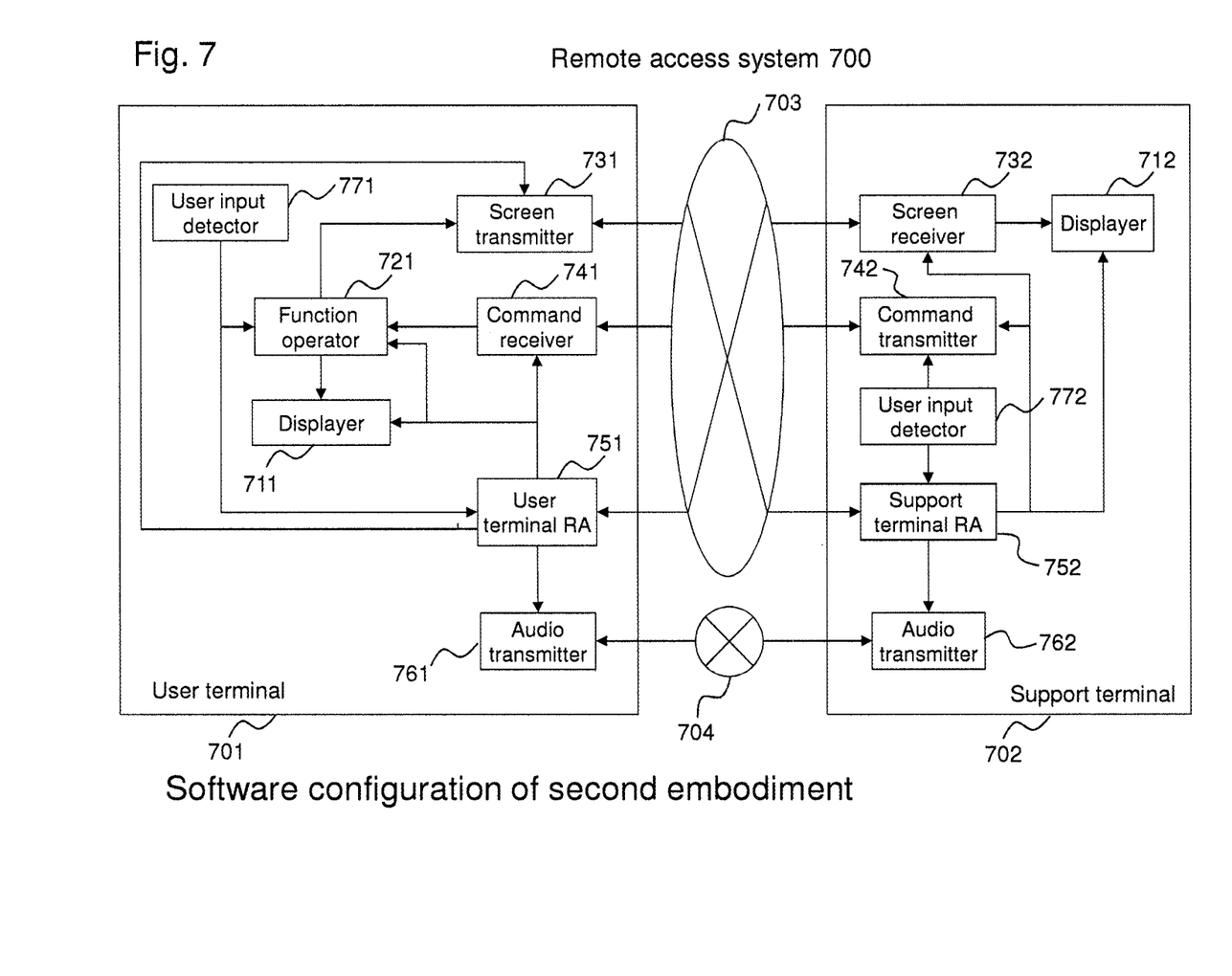
FIG. 7 is a block diagram illustrating a system configuration and a software configuration in the remote access system according to the second embodiment.

FIG. 7 illustrates a system configuration and a software configuration for the remote access system. A remote access system 700 includes a user terminal 701 and a support terminal 702. The user terminal 701 and the support terminal 702 are connected over a data transmission network 703 and an audio transmission network 704. The user terminal 701 and the support terminal 702 are each mobile devices 60.

Software for programs and data run by the CPU 14 of the user terminal 701 includes a user input detector 771, a displayer 711, a feature operator 721, a screen transmitter 731, a command receiver 741, a user terminal remote accesser (user terminal RA) 751, and a call controller 761.

The displayer 711 displays an application run screen and progress data on the screen display 12, the application run screen being run by the feature operator 721 and the progress data being received from the user terminal RA 751.

The feature operator 721 runs a menu or application installed on the user terminal 701 based on user input and outputs the run screen to the displayer 711 and the screen transmitter 731. Normally (when the remote access is not in use), content operated by the user via the touch screen 11 is received by the user input detector 771, then the feature operator 721 operates the application according to the content of the operation. When the remote access is in use, the feature operator 721 operates the application based on a user operation command received by the command receiver 741.

The screen transmitter 731 issues a command to the data transmitter 61 to transmit the application run screen received from the feature operator 721 to a screen receiver 732 in the support terminal 702 over the data transmission network 703.

The command receiver 741 operates the application from the feature operator 721 based on the user input received from a command transmitter 742 in the support terminal 702.

The user terminal RA 751 fills a central role in implementing the remote access in the user terminal 701. The user terminal RA 751 communicates with a support terminal RA 752 in the support terminal 702 and issues a command to implement the remote access, granting remote access to the feature operator 721, the command receiver 741, a multi-screen transmitter, the displayer 711, and the call controller 761 in the user terminal 701. In addition, the user terminal RA 751 retains authentication data for authenticating the support terminal 702.

The call controller 761 issues a command to the audio transmitter 62 to make an audio transmission to the support terminal 702 instructed by the user terminal RA 751.

The user input detector 771 in the user terminal 701 receives the user's operation content, which was input via the touch screen 12, and transmits the user's operation content to the receiving feature operator 721 and the user terminal RA 751.

The software for programs and data run by the CPU 14 in the support terminal 702 includes a user input detector 772, a displayer 712, the screen receiver 732, a command transmitter 742, the support terminal remote accesser (support terminal RA) 752, and a call controller 762.

The application run screen running on the user terminal 701, which is received by the screen receiver 732, is displayed on the screen display 12 by the displayer 712.

The screen receiver 732 issues a command to display on the displayer 712 the application run screen received from the screen transmitter 731.

The command transmitter 742 transmits the user input received from the user input detector 772 to the command receiver 741 in the user terminal 701.

The support terminal RA 752 fills a central role in implementing the remote access in the support terminal 702. The support terminal RA 752 communicates with the user terminal RA 751 and issues a command to implement the remote access, granting remote access to the screen receiver 732, the command transmitter 742, the call controller 762, and the display 712. In addition, the support terminal RA 752 retains authentication data for performing authentication with the user terminal 701.

The call controller 762 issues a command to the audio transmitter 62 to make an audio transmission to the user terminal 701 instructed by the support terminal RA 752.

The user input detector 772 in the support terminal 702 transmits operation content from the user, which was input via the touch screen 12, to the command transmitter 742 and the support terminal RA 752.

Moreover, a single mobile device 60 may serve as both the user terminal 701 and the support terminal 702.

Figure 8:
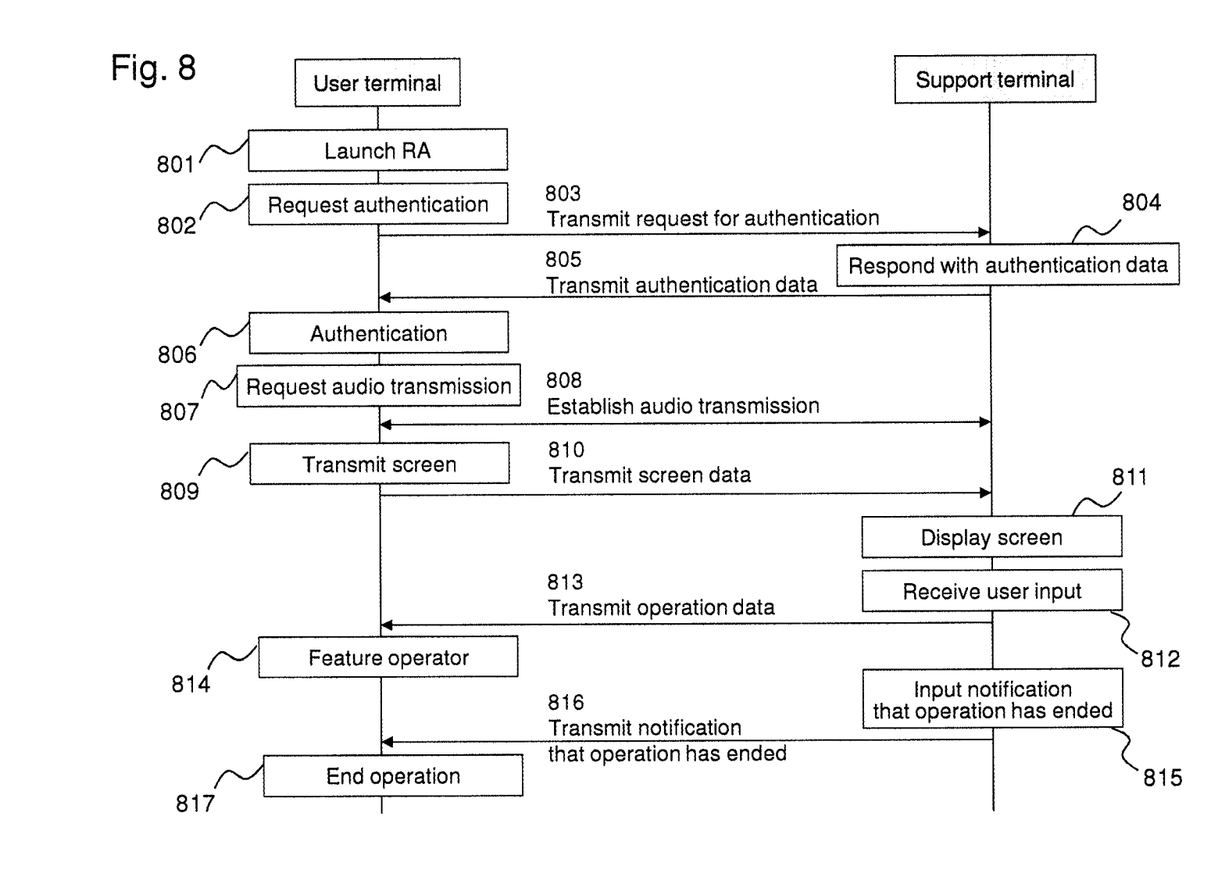
FIG. 8 is a sequential diagram illustrating a procedural flow between a user terminal and a support terminal in the remote access system according to the second embodiment.
Figure 9:
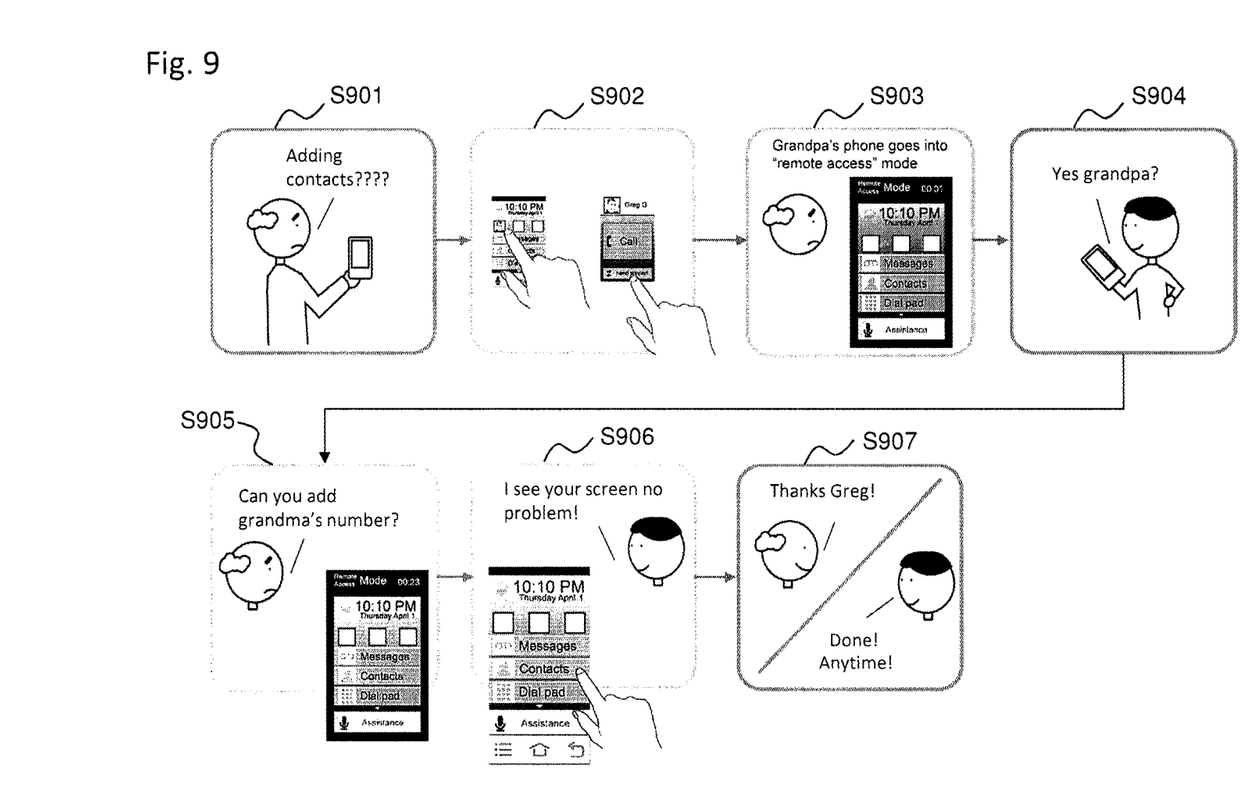
FIG. 9 is a diagram summarizing operations of the remote access system according to the second embodiment.

Next, with reference to FIG. 8, a process for the remote access between the user terminal 701 and the support terminal 702 is described. FIG. 8 is a sequential diagram illustrating a flow for the process in the remote access system 700 between the user terminal 701 and the support terminal 702.

First, the user issues a command for the support terminal 702 in the address book from which a remote access connection is desired. When the user selects "request remote access connection," the user terminal RA 751 initiates a remote access connection process (step S801). Next, the user terminal RA 751 generates an authentication request to determine whether the support terminal 702 is the correct support terminal 702 and transmits the authentication request to the support terminal 702 via the data transmitter 61 (steps S802 and S803). The support terminal RA 752 in the support terminal 702 receives the authentication request from the user terminal 701 and transmits the authentication data stored in the support terminal 702 to the user terminal 701 (steps S804 and S805). The user terminal RA 751 receives the authentication data, then compares the authentication data stored in the user terminal RA 751 with the authentication data sent from the support terminal 702 to determine if there is a match. When the authentication data matches, the user terminal RA 751 completes the authentication of the support terminal 702 as the correct support terminal 702 and advances to the next step. When the authentication data does not match, the user terminal RA 751 determines that the support terminal 702 is incorrect and ends the remote access process (step S806).

Next, the user terminal RA 751 issues a command to the call controller 761 to make an audio transmission to the support terminal 702 (step S807), then the call controller 761 issues a command to the audio transmitter 62 in the user terminal 701 to make an audio transmission to the support terminal 702 (step S808).

Once the call goes through, the user on the user terminal 701 describes over the audio transmission the nature of the request for proxy control to the user of the support terminal 702.

Simultaneous with making the audio transmission, the user terminal RA 751 issues a command to the screen transmitter 731 to transmit the application run screen run by the feature operator 721 to the support terminal 702. The screen transmitter 731 then transmits the application run screen run by the feature operator 721 to the support terminal 702 (step S810). The screen receiver 732 receives the run screen, then issues a command to the displayer 712 to display the received run screen on the screen display 12. The displayer 712 receives the command, then displays the run screen on the screen display 12 (step S811). While referring to the application run screen running on the user terminal 701, the user of the support terminal 702 performs the requested operation on the run screen of the user terminal 701 displayed on the support terminal 702. The user input detector 772 detects the operation content from the user (step S812), then transmits the detected operation content to the user terminal 701 (step S813). The command receiver 741 receives the operation content transmitted from the support terminal 702 and transmits the operation content to the feature operator 721, then the function operator 721 operates the application based on the operation content received (step S814). Steps S809 to S814 are repeated by the user of the support terminal 702 until the operation is determined to be complete.

When the operation requested of the user of the support terminal 702 is complete, that information is inputted to the support terminal RA 752 (step S815). The support terminal RA 752 notifies the user terminal 701 that the requested operation is complete (step S816). The user terminal RA 751 receives the notification, then terminates communication (step S817). Moreover, because there is a possibility that both users may continue conversing, there is no need to terminate the audio transmission.

Moreover, while repeating steps S808 to S814, the user of the support terminal 702 may inform the user of the user terminal 701 of the user's progress. Thereby, when an operation takes time to complete, the user of the user terminal 701 can be informed of time remaining or can call up the time remaining when necessary.

Figure 10:
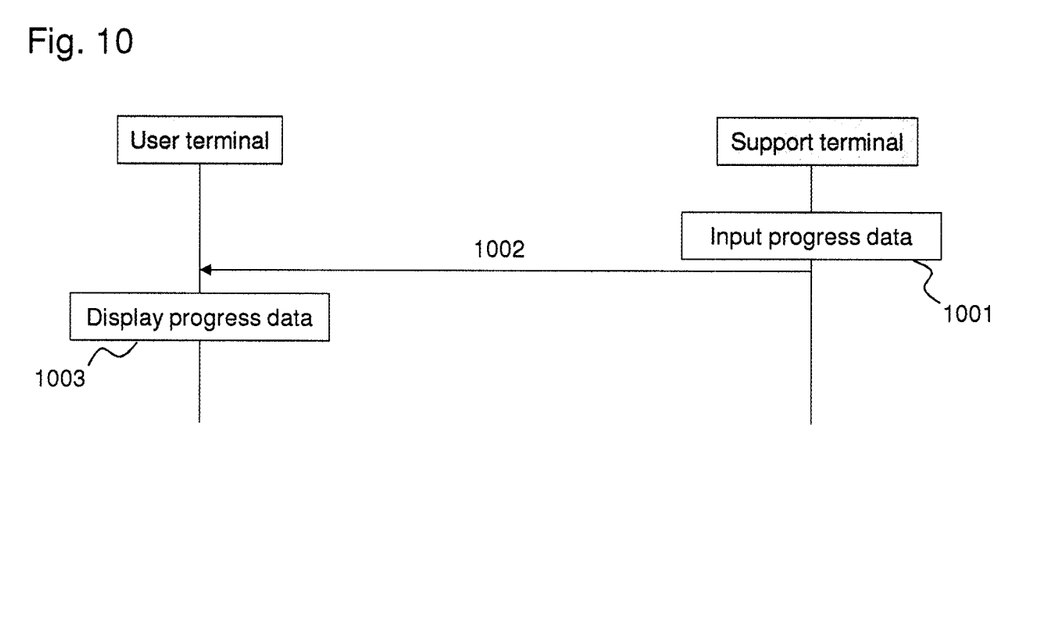
FIG. 10 is a sequential diagram illustrating a procedural flow for transmitting progress data in the remote access system according to the second embodiment.

FIG. 10 is a sequential diagram illustrating a flow for the process in the user terminal 701 and the support terminal 702 when informing the user of the user terminal 701 of the progress. The process for informing the user of the user terminal 701 of the progress is performed in parallel with the process of steps S808 to S814. First, the user of the support terminal 702 inputs progress data (step S1001). The progress data is, for example, a completion notification, time remaining, or percentage of steps completed out of all steps. The support terminal RA 752 transmits the input progress data to the user terminal 701 (step S1002), then the user terminal RA 751 issues a command to the displayer 711 to display the received progress data on the screen.

Figure 11A:
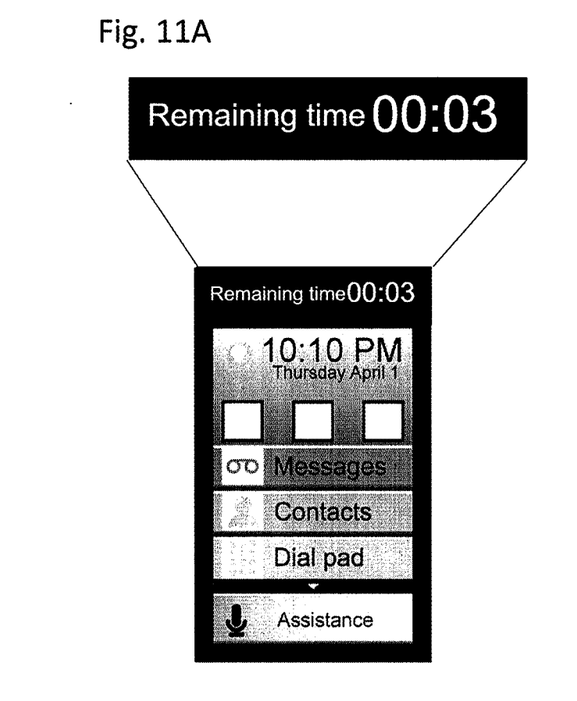
FIGS. 11A and 11B illustrate examples of progress data being displayed or transmitted according to the second embodiment.
Figure 11B:
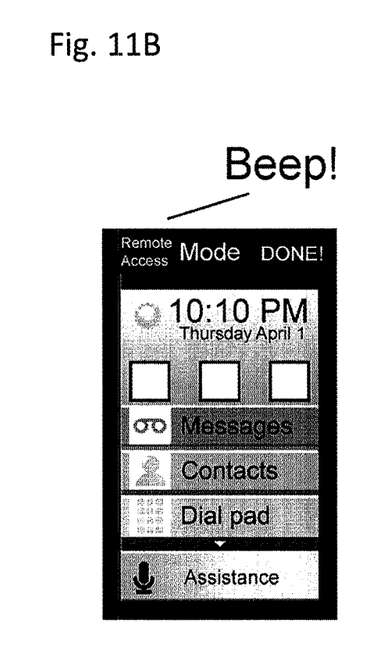

FIGS. 11A and 11B illustrate examples of progress data being displayed or transmitted. FIG. 11A is an example of a timer being displayed on the user terminal 701 to indicate the time remaining. FIG. 11B is an example of the user terminal 701 beeping when the operation is complete. When a notification of this kind is used, there is no need for the user of the user terminal 701 to continuously monitor the progress on the user terminal 701. The user's time can thus be employed more effectively. This is especially useful when the request is expected to take time to complete, such as when the user of the user terminal 701 requests proxy control for shopping or member registration.

As described above, the user of the user terminal 701 is able to receive proxy control from the user of the support terminal 702 even for difficult operations, and thus usability of the mobile device 60 is improved.

As described above, a mobile device and a display control method according to the present invention enable a user to select a screen display for the mobile device suited to the user's preferences from a mode displaying a plurality of kinds of screens. The present invention is thus useful in improving operability.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. A mobile device comprising:
a touch screen that receives an input from a user;
a display that displays a menu screen and is positioned such that the touch screen is overlaid on the display;

a menu screen generator that generates the menu screen displayed on the display, a querier that queries the user for the interface to be used; and a user status detector that detects a status of the user, wherein the menu screen can be selected from a plurality of user interfaces, and wherein the querier queries the user for the interface to be used when the user status detector detects that the status of the user has changed.

2. The mobile device according to claim 1, further comprising:

a switcher that issues a command to the menu screen generator to switch the user interface for the menu screen based on content input by the user with the touch screen in response to the query of the querier, wherein the menu screen generator generates the menu screen for the user interface based on the command from the switcher.

3. The mobile device according to claim 2, further comprising:

a user interface database retaining a sample image of the user interface for the menu screen, wherein the querier suggests the sample image of the user interface to the user when the querier queries the user for the user interface.

4. The mobile device according to claim 3, wherein the switcher has the user select the user interface using a slider bar.

5. The mobile device according to claim 2, wherein the user status detector detects the status of the user when the mobile device is turned on.

6. The mobile device according to claim 2, wherein the switcher launches when the mobile device is turned on.

7. The mobile device according to claim 1, wherein the user status is comprises geographical location data for a user.

8. The mobile device according to claim 1, wherein the user status detector detects that the status of the user has changed based on a comparison of stored previous user status information and sensed current user status information.

9. The mobile device according to claim 8, wherein the current user status information is sensed without manual input by the user.

10. The mobile device according to claim 1, wherein the user status detector detects information related to a location of the mobile device.

11. The mobile device according to claim 1, wherein the user status detector detects information based upon an application installed on the mobile device.

12. The mobile device according to claim 1, wherein the user status detector detects information related to an environment of the mobile device.

13. The mobile device according to claim 1, wherein the querier queries the user for the interface to be used only when the detector detects that the status of the user has changed.

14. The mobile device according to claim 1, wherein the querier queries the user for the interface to be used in response to the detector detecting that the status of the user has changed.

15. A display control method comprising:

displaying a menu screen, which can be selected from a plurality of user interfaces, on a display and provided such that a touch screen is overlaid on the display;

receiving input from a user by the touch screen;

detecting a user status; and querying the user for the interface to be used when detecting that the user status has changed.

16. The display control method according to claim 15, further comprising:

determining whether to switch the user interface for a menu screen based on the user status;

displaying a selection screen to select the user interface when the determination determines that switching is to be performed; and displaying on the display the menu screen using the user interface selected by a user.

17. The display control method according to claim 15, wherein, the user status is detected when power is turned on.

* * * * *